(12) United States Patent
Henry

(10) Patent No.: US 6,361,361 B1
(45) Date of Patent: Mar. 26, 2002

(54) ELECTRICAL OUTLET COVER PLATE

(75) Inventor: Dennis W. Henry, Chadds Ford, PA (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/722,877

(22) Filed: Nov. 27, 2000

(51) Int. Cl.[7] .............................. H02G 3/14; H05K 5/03
(52) U.S. Cl. ............................ 439/536; 174/67; 220/3.8
(58) Field of Search .............................. 439/536, 136, 439/142; 174/67, 66; 220/3.8, 242

(56) References Cited

U.S. PATENT DOCUMENTS

| | | | |
|---|---|---|---|
| 4,293,173 A | * 10/1981 | Tricca | 174/67 |
| 4,603,932 A | 8/1986 | Heverly | 339/39 |
| 4,660,912 A | * 4/1987 | Tomek | 174/67 |
| 5,114,365 A | 5/1992 | Thompson et al. | 439/540 |
| 5,835,980 A | 11/1998 | Houssian | 174/67 |

\* cited by examiner

Primary Examiner—Gary Paumen
(74) Attorney, Agent, or Firm—Roger H. Criss

(57) ABSTRACT

An electrical outlet cover for enclosing an electrical outlet wall box which has enhanced stiffness and prevention of corner bending and/or twisting while employing a minimum amount of material for a maximum stiffness. It comprises a generally rectangular plate having electrical plug passages and upper and lower linear arrays of cored, rectangular stiffening ribs projecting outwardly from the back surface of the plate and positioned along each of an upper and a lower edge of the plate. It further has left and right linear arrays of cored, rectangular stiffening ribs positioned between the electrical plug passages and left and right edges of the plate which extend from the upper linear array to the lower linear array. A central linear array of stiffening ribs project are positioned between the electrical plug passages and extend from the left linear array to the right linear array. A reinforced opening for receiving a screw extend through the plate at the midpoint of the central linear array. Reinforcing fingers project outwardly from the back surface of the plate and extend from edges of the plate to left and right linear arrays.

17 Claims, 1 Drawing Sheet

ELECTRICAL OUTLET COVER PLATE

BACKGROUND OF THE INVENTION

1. Field of the Invention

The present invention relates to an electrical outlet cover for enclosing an electrical outlet box.

2. Description of the Related Art

Electrical outlet wall cover plates are common fixtures in most homes and businesses for covering connections to electrical outlets mounted on walls. The connections are made within electrical boxes that are anchored to supports within the walls. Open ends of the boxes are accessible through holes formed in the walls for making the connections to the electrical outlets. The wall plates are mounted on the outlets and cover both the electrical boxes and the access holes that are formed in the walls. One or more openings are formed in the plates to permit receptacles of the electrical outlets to project into front faces of the plates for receiving electrical plugs.

Most wall plates are either stamped out or molded from a material such as plastics, wood or ceramic and are produced in standard sizes and shapes. The most common wall plates are sized to accommodate electrical outlets with duplex receptacles. Similarly sized wall plates are also used to cover connections to a variety of other electrical fixtures including wall switches and communication outlets. The wall plates are attached to wall surfaces with screws.

A problem with current wall plates is that they need to have sufficient strength and stiffness to resist breakage when being screwed to the outlet box and to resist peel-back at the corners. They also need to be mass produced economically. Commonly produced wall plates are composed of urea polymers. These are approximately ten times stiffer than comparable plates made from nylon, however, they are subject to easy breakage. While it would be possible to produce thicker wall plates which would have better breakage and peel-back resistance, such would be economically disadvantageous.

Wall plates having reinforcing ribs are known in the art. See for example, U.S. Pat. Nos. 4,603,932, 5,114,365, and 5,835,980, however, such do not teach linear arrays of cored, rectangular stiffening ribs.

It would be desired to produce an electrical outlet cover for enclosing an electrical outlet box which has enhanced stiffness and prevention of corner twisting while employing a minimum amount of material for a maximum stiffness.

It has now been found that by forming a wall plate having strategically places arrays of ribs on its back side, one can attain a thin plate having a high degree of stiffness. The location of the ribs is important for attaining an advantageous stiffness to weight ratio, i.e. employing a minimum amount of material for a maximum stiffness. The stiffness and prevention of corner twisting can be further enhanced by selectively varying the plate wall thickness, that is by reinforcing the plate material at optimal locations such as around electrical plug passages and the screw hole.

SUMMARY OF THE INVENTION

The invention provides an electrical outlet cover for covering an electrical outlet box which comprises:

(a) a generally rectangular plate having front and back surfaces and upper, lower, left and right edges defining corners at the intersection of adjacent edges; said plate having upper and lower electrical plug passages extending through the front surface and back surface;

(b) upper and lower linear arrays of cored, rectangular stiffening ribs projecting outwardly from the back surface of the plate, one array positioned along each of an upper and a lower edge of the plate;

(c) left and right linear arrays of cored, rectangular stiffening ribs projecting outwardly from the back surface of the plate, the left linear array positioned between the electrical plug passages and a left edge of the plate and the right linear array positioned between the electrical plug passages and a right edge of the plate; each of the left and right linear arrays extending from the upper linear array to the lower linear array;

(d) at least one central linear array of cored, rectangular stiffening ribs projecting outwardly from the back surface of the plate positioned between the electrical plug passages and extending from the left linear array to the right linear array;

(e) a reinforced opening for receiving a screw extending through the front surface and back surface of the plate and positioned at the midpoint of the central linear array; and (f) a plurality of side reinforcing fingers projecting outwardly from the back surface of the plate and extending from the left edge of the plate to the left linear array, and from the right edge to the right linear array.

DETAILED DESCRIPTION OF THE PREFERRED EMBODIMENT

Figure 1:
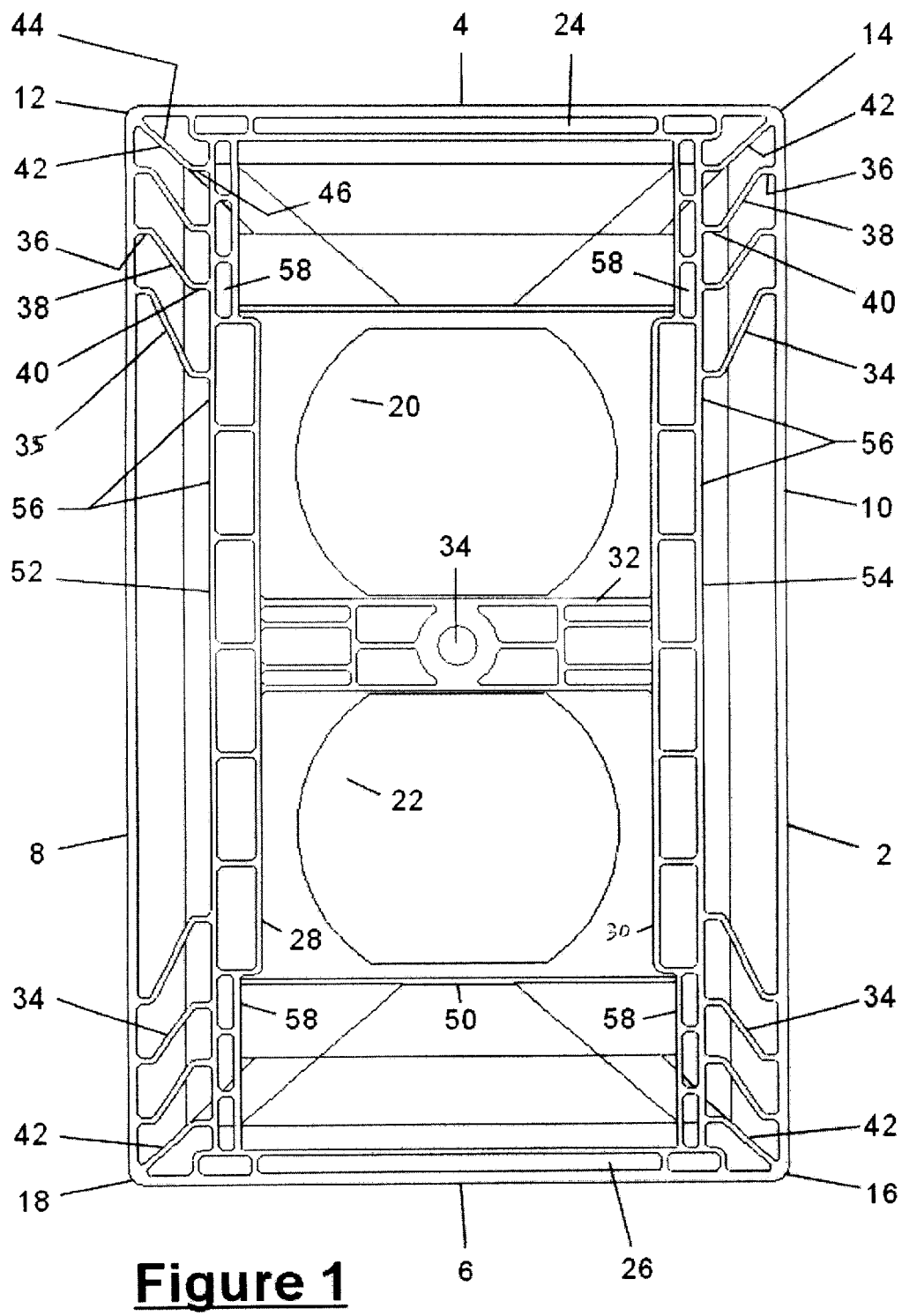
FIG. 1 shows a rear view of an electrical outlet cover according to the invention.

FIG. 1 depicts an electrical outlet cover for covering an electrical outlet box according to the invention. It comprises a generally rectangular plate having a front surface, a back surface, an upper edge 4, a lower edge 6, a left edge 8 and a right edge 10 defining corners 12, 14, 16 and 18 at the intersections of adjacent edges. The plate has an upper electrical plug passage 20 and a lower electrical plug passage 22 extending through the front surface and back surfaces of the plate.

Projecting outwardly from the back surface of the plate are upper and lower linear arrays of cored, rectangular stiffening ribs 24 and 26. The upper array of cored, rectangular stiffening ribs 24 is positioned along the upper edge 4 of the plate and the lower array of cored, rectangular stiffening ribs 26 is positioned along the lower edge 6 of the plate.

Also projecting outwardly from the back surface of the plate are left and right linear arrays of cored, rectangular stiffening ribs 28 and 30. The left linear array 28 is positioned between the electrical plug passages 20 and 22 and the left edge 8 of the plate. The right linear array 30 is positioned between the electrical plug passages and the right edge 10 of the plate. Each of the left and right linear arrays 28 and 30 extend from the upper linear array 24 to the lower linear array 26.

Further projecting outwardly from the back surface of the plate is at least one central linear array of cored, rectangular stiffening ribs 32 positioned between the electrical plug passages 20 and 22 and extending from the left linear array 28 to the right linear array 30. A reinforced opening 34 for receiving a screw extends through the front surface and back surface of the plate is positioned at the midpoint of the central linear array 32.

A plurality of side reinforcing fingers 35 project outwardly from the back surface of the plate and extend from the left edge 8 of the plate to the left linear array 28 and from the right edge 10 to the right linear array 30.

Preferably each of the side reinforcing fingers 35 comprises a first tab 36 attached to one of the left and right edges parallel to the upper and lower edges. These extend to a diagonal central portion 38 which in turn extends to a second tab 40 which tab is parallel to the upper and lower edges and attached to the closest of the left and right linear arrays 28 and 30.

The cover also comprising corner reinforcing fingers 42 projecting outwardly from the back surface of the plate which extend from each of the corners of the plate to the closest of the left and right linear arrays. Preferably each of the corner reinforcing fingers 42 comprises a diagonal portion 44 attached to one of the corners which extends to a tab 46. The tab is parallel to the upper and lower edges and attached to the closest of the left and right linear arrays.

Preferably the plate comprises a material which is thicker in a region extending from the top of the upper plug passages 48 to a bottom of the lower plug passage 50 and from a left edge 52 of the left linear array to the right edge 54 of the right linear array.

Preferably the left and right linear arrays 28 and 30 each comprise a central sub-array 56 of cored, rectangular stiffening ribs which are larger than terminal sub-arrays 58 of cored, rectangular stiffening ribs.

The entire electrical outlet cover is preferably comprised of an electrically non-metallic material which is capable of passing the Underwriter's Laboratory five inch flame test as specified in UL514D, and other standards. Preferred materials are thermoplastic polymers such as nylons, polyesters, particularly polyethylene terephthalate (PET), polyester containing copolymers such as PET copolymers, polyolefins, ethylene vinyl alcohol copolymers, acrylonitrile copolymers, acrylic polymers, vinyl polymers, polycarbonate, polystyrene, polyurethanes and combinations thereof. The most preferred material is a nylon such as are available commercially from Honeywell International Inc. of Morristown, N.J. as Capron® brand nylons.

The composition may optionally also include one or more conventional additives whose uses are well known to those skilled in the art. The use of such additives may be desirable in enhancing the processing of the compositions as well as improving the plates formed therefrom. Examples of such include: oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators, plasticizers, as well as other conventional additives known to the art. Such may be used in any conventional amount, such as amounts of up to about 10% by weight of the overall composition.

The plate may be formed through any well known process including thermoforming, blow molding and injection molding. An injection molding process softens the thermoplastic nylon blend or other material in a heated cylinder, injecting it while molten under high pressure into a closed mold, cooling the mold to induce solidification, and ejecting the molded plate from the mold.

The thickness of the plate preferably ranges from about 0.5 mm to about 3.85 mm, and more preferably from about 1.0 mm to about 2.95 mm. When the plate has a thicker portion in a region extending from the top of the upper plug passages to a bottom of the lower plug passage and from a left edge of the left linear array to the right edge of the right linear array, this area preferably has a thickness which preferably ranges from about 1.75 mm to about 3.85 mm, and more preferably from about 2.5 mm to about 2.95 mm. The walls of the linear arrays of cored, rectangular stiffening ribs and the reinforcing fingers have a thickness of the plate which preferably ranges from about 0.25 mm to about 1.30 mm and more preferably from about 0.5 mm to about 0.80 mm. The rectangular stiffening ribs and the reinforcing fingers have a height which preferably ranges from about 0.90 mm to about 4.70 mm and more preferably from about 1.45 mm to about 4.2 mm.

While the present invention has been particularly shown and described with reference to preferred embodiments, it will be readily appreciated by those of ordinary skill in the art that various changes and modifications may be made without departing from the spirit and scope of the invention. It is intended that the claims be to interpreted to cover the disclosed embodiment, those alternatives which have been discussed above and all equivalents thereto.

What is claimed is:

1. An electrical outlet cover for covering an electrical outlet box which comprises:

(a) a generally rectangular plate having front and back surfaces and upper, lower, left and right edges defining corners at the intersection of adjacent edges; said plate having upper and lower electrical plug passages extending through the front surface and back surface;

(b) upper and lower linear arrays of cored, rectangular stiffening ribs projecting outwardly from the back surface of the plate, one array positioned along each of an upper and a lower edge of the plate;

(c) left and right linear arrays of cored, rectangular stiffening ribs projecting outwardly from the back surface of the plate, the left linear array positioned between the electrical plug passages and a left edge of the plate and the right linear array positioned between the electrical plug passages and a right edge of the plate; each of the left and right linear arrays extending from the upper linear array to the lower linear array;

(d) at least one central linear array of cored, rectangular stiffening ribs projecting outwardly from the back surface of the plate positioned between the electrical plug passages and extending from the left linear array to the right linear array;

(e) a reinforced opening for receiving a screw extending through the front surface and back surface of the plate and positioned at the midpoint of the central linear array; and (f) a plurality of side reinforcing fingers projecting outwardly from the back surface of the plate and extending from the left edge of the plate to the left linear array, and from the right edge to the right linear array.

2. The electrical outlet cover of claim 1 wherein each of the side reinforcing fingers comprises a first tab attached to one of the left and right edges parallel to the upper and lower edges, extending to a diagonal central portion which extends to a second tab which tab is parallel to the upper and lower edges and attached to the closest of the left and right linear arrays.

3. The electrical outlet cover of claim 1 comprising corner reinforcing fingers projecting outwardly from the back surface of the plate and extending from each of the corners of the plate to the closest of the left and right linear arrays.

4. The electrical outlet cover of claim 1 wherein each of the corner reinforcing fingers comprises a diagonal portion attached to one of the corners which extends to a tab, which tab is parallel to the upper and lower edges and attached to the closest of the left and right linear arrays.

5. The electrical outlet cover of claim 1 wherein the plate comprises a material which is thicker in a region extending from a top of the upper plug passages to a bottom of the lower plug passage and from a left edge of the left linear array to the right edge of the right linear array.

6. The electrical outlet cover of claim 1 wherein the left and right linear arrays each comprise a central sub-array of cored, rectangular stiffening ribs which are larger than terminal sub-arrays of cored, rectangular stiffening ribs.

7. The electrical outlet cover of claim 1 which is comprised of an electrically non-metallic material.

8. The electrical outlet cover of claim 1 which is comprised of a thermoplastic polymer.

9. The electrical outlet cover of claim 1 which is comprised of an thermoplastic polymer selected from the group consisting of nylons, polyesters, polyester containing copolymers, polyolefins, ethylene vinyl alcohol copolymers, acrylonitrile copolymers, acrylic polymers, vinyl polymers, polycarbonate, polystyrene, polyurethanes and combinations thereof.

10. The electrical outlet cover of claim 1 which is comprised of a nylon.

11. The electrical outlet cover of claim 1 wherein the thickness of the plate ranges from about 0.5 mm to about 3.85 mm; wherein the walls of the linear arrays of cored, rectangular stiffening ribs and the reinforcing fingers have a thickness of the plate which ranges from about 0.25 mm to about 1.30 mm; and wherein the rectangular stiffening ribs and the reinforcing fingers have a height which ranges from about 0.90 mm to about 4.70 mm.

12. The electrical outlet cover of claim 5 wherein the thickness of the plate in the thicker region ranges from about 1.75 mm to about 3.85 mm.

13. An electrical outlet cover for covering an electrical outlet box which comprises:

(a) a generally rectangular plate having front and back surfaces and upper, lower, left and right edges defining corners at the intersection of adjacent edges; said plate having upper and lower electrical plug passages extending through the front surface and back surface;

(b) upper and lower linear arrays of cored, rectangular stiffening ribs projecting outwardly from the back surface of the plate, one array positioned along each of an upper and a lower edge of the plate;

(c) left and right linear arrays of cored, rectangular stiffening ribs projecting outwardly from the back surface of the plate, the left linear array positioned between the electrical plug passages and a left edge of the plate and the right linear array positioned between the electrical plug passages and a right edge of the plate; each of the left and right linear arrays extending from the upper linear array to the lower linear array;

(d) at least one central linear array of cored, rectangular stiffening ribs projecting outwardly from the back surface of the plate positioned between the electrical plug passages and extending from the left linear array to the right linear array;

(e) a reinforced opening for receiving a screw extending through the front surface and back surface of the plate and positioned at the midpoint of the central linear array;

(f) a plurality of side reinforcing fingers projecting outwardly from the back surface of the plate and extending from the left edge of the plate to the left linear array, and from the right edge to the right linear array; wherein each of the side reinforcing fingers comprises a first tab attached to one of the left and right edges parallel to the upper and lower edges, extending to a diagonal central portion which extends to a second tab which tab is parallel to the upper and lower edges and attached to the closest of the left and right linear arrays;

(g) corner reinforcing fingers projecting outwardly from the back surface of the plate and extending from each of the corners of the plate to the closest of the left and right linear arrays; wherein each of the corner reinforcing fingers comprises a diagonal portion attached to one of the corners which extends to a tab, which tab is parallel to the upper and lower edges and attached to the closest of the left and right linear arrays.

14. The electrical outlet cover of claim 13 wherein the plate comprises a material which is thicker in a region extending from a top of the upper plug passages to a bottom of the lower plug passage and from a left edge of the left linear array to the right edge of the right linear array.

15. The electrical outlet cover of claim 13 wherein the left and right linear arrays each comprise a central sub-array of cored, rectangular stiffening ribs which are larger than terminal sub-arrays of cored, rectangular stiffening ribs.

16. The electrical outlet cover of claim 13 which is comprised of an electrically non-metallic material.

17. The electrical outlet cover of claim 13 which is comprised of a nylon.

\* \* \* \* \*